July 7, 1964 F. J. BAUER 3,140,383
SPOT WELDER
Filed Aug. 8, 1961 2 Sheets-Sheet 1
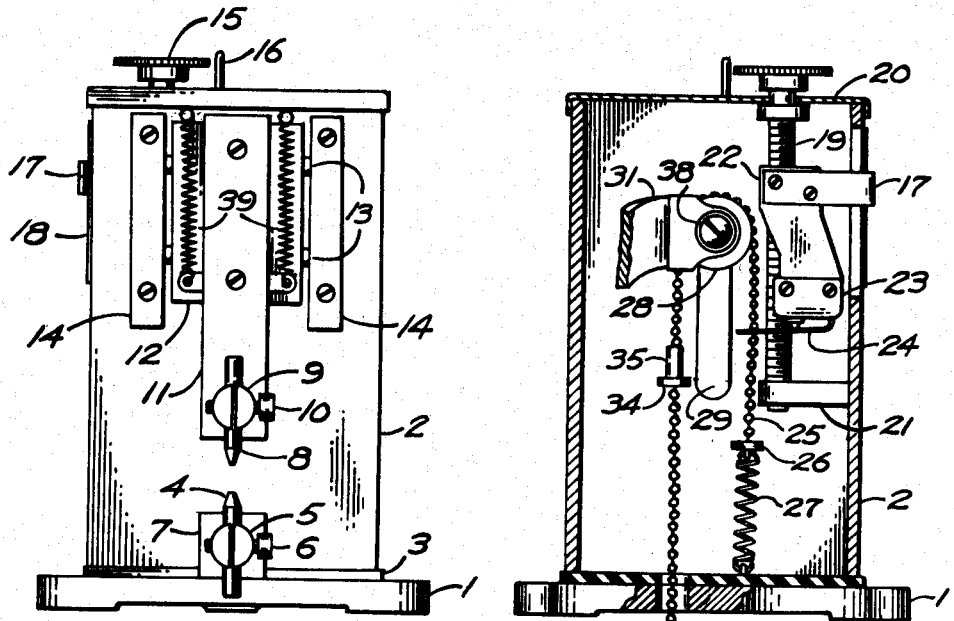
FIG. 1
FIG. 2
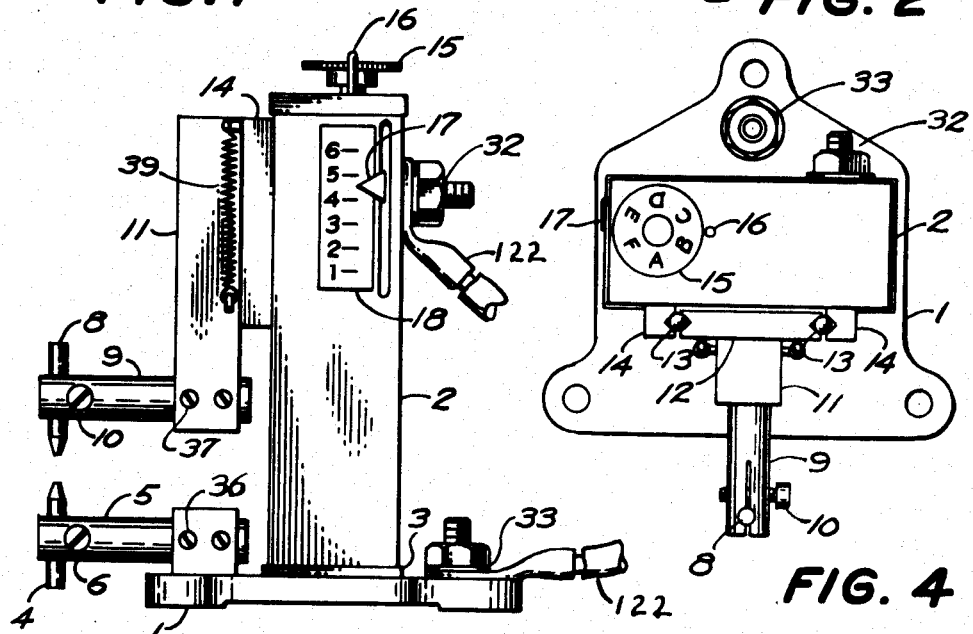
FIG. 3
FIG. 4
INVENTOR.
Frank J. Bauer

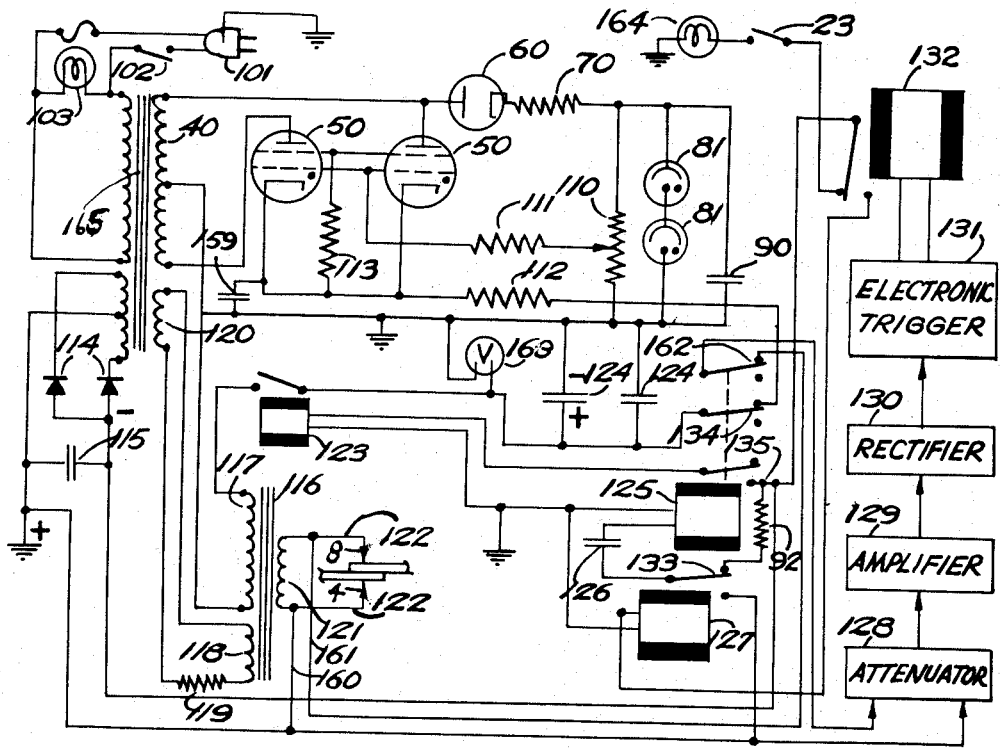

.

United States Patent Office 3,140,383
Patented July 7, 1964

3,140,383
SPOT WELDER
Frank J. Bauer, Northridge, Calif.
(102 S. Beach St., Ormond Beach, Fla.)
Filed Aug. 8, 1961, Ser. No. 130,050
7 Claims. (Cl. 219—110)

This invention relates generally to electrical resistance welding apparatus, and more particularly to resistance spot welding apparatus, using a combination of electrical current, ohmic resistance, pressure, and time to momentarily melt, force together, and fuse as one, over a limited area, two separate pieces of metal, and to do this with great repeatability.

Since the introduction of resistance spot welding, there have been many ways devised to supply a limited amount of weld current, a measured amount of weld current, and a timed weld current, as well as ways to force the metals being welded together towards each other at the critical moment when they are fluid, due to the heat developed by this current flowing through the resistance (ohmic) of the metals at the point of contact. My following invention ties together and co-ordinates all these features as one operation, the degree of participation of each one being controlled, as well as introducing an entirely new method of initiating the weld cycle by measuring the ohmic resistance across the electrodes and using this value to insure good repeatable welds.

Any person versed in the electrical art, or that of resistance welding, knows that it requires two factors to develop heat electrically, one is current (electrical) and the other is resistance (ohmic), and if these two factors are duplicated as to quantity, the resulting heat generated will also be duplicated for all practical purposes, and while prior art has been able to duplicate the rate and quantity of current to close limits, the ohmic resistance between the pieces to be welded has rather randomly been interpolated into terms of pressure, generally, and the weld cycle initiated when a preselected pressure has been reached. It is true that the tighter two conductors are pressed together, the less ohmic resistance there is between them, but only under the most ideal controlled conditions would it be possible to press two sets of supposedly the same conductors together, and arrive at the same ohmic resistance, and this would be doubtful. Moreover, metals supposedly the same, could vary from day to day, because of oxidation or contamination, and alloys of different batches could present even more problems and when, to this, is added the fact that during any welding operation, there is some burning of the electrodes, as well as possible molecular migration of the weld metal into the electrodes during each weld, so that any pressure/resistance (ohmic) interpolation made during the initial set-up would gradually change, so that several welds lated, there would be an entirely different set of conditions, and these changes would become increasingly more important as the welding operation became more delicate in nature, due to the smaller mass involved, resulting in costly shut-downs while a new set-up is being laboriously made. In addition to this, the fact that a typical pressure/resistance interpolation has changed in regard to the weld heat produced is generally known only after good parts have been destroyed, or even more costly failures have occurred after sale. It is apparent to those skilled in the art, that it is highly desirable to have a combination of timed current, measured current, closely repeatable ohmic resistance, and a means to warn the operator when the welding electrodes have become so contaminated that they can no longer make good wells.

Ordinarily, prior resistance welding has been accomplished by placing the two pieces of metal to be welded between a moveable electrode and a stationary electrode and bringing the electrodes to bear against each other with the metals between, and passing a heavy current through the "work" as soon as a pre-determined pressure has been reached, the current and pressure being adjustable to suit the thickness and nature of the metal. Assuming that the proper heat has been arrived at by this system, next in importance is that the moveable electrode be of low enough mass to provide a fast follow-up the moment the metals being welded are pushed together and the fluid metal intermingles, to form the bond between them.

An object of my invention is a circuit to sense ohmic resistance, as such, across the initially low resistance between welding electrodes as they press together the two metals being welded, and to initiate the weld cycle when a pre-determined resistance is reached, and to refuse to try to weld if this level is not reached.

An object of my invention is to provide an operator with a signal when pressures greater than originally set up for are being used.

An object of my invention is to provide an as regulated and measured source of weld current as the state of the art permits.

An object of my invention is to provide a simple time limit for weld current flow, adjustable as to set-up, but beyond operator control.

An object of my invention is to provide a minimum part, low mass moveable electrode assembly for fast follow-up during weld time.

An object of my invention is to provide a vernier pressure limit indicator, so welding set-ups once established may later be duplicated closely, without need of other accessories.

An object of my invention is to provide an operator with a signal when the electrodes have become so contaminated that they can no longer make good welds.

How the foregoing objects are accomplished may be better understood by the following detailed description of the mechanical welder head, and the electrical and electronic circuit.

FIG. 1 is a front view of the welder head.

FIG. 2 is a rear view of the welder head with the back cover off to show the placement of the parts.

FIG. 3 is a side view of the welder head with the coarse pressure indicator plate and pointer transposed, as it is immaterial which side it is on.

FIG. 4 is a top view of the welder head showing the vernier dial, the ball races, and the base with its hold-down holes.

FIG. 5 is the supply and relay circuit, including the timed power pulse.

FIG. 6 is the circuit that is used to measure the resistance across the work between the electrodes and initiate the weld cycle.

Referring to FIG. 1, 1 is the base of the welder head upon which is mounted the welder head body, 2, the two being electrically insulated from each other by insulating section 3. The lower fixed electrode 4 is clamped in lower electrode arm 5 by electrode clamp screw 6. Lower electrode arm 5 is held in boss 7 which is a part of base 1 by set screws 36, as shown in FIG. 3. In FIG. 1, upper movable electrode 8 is clamped in upper electrode arm 9 with electrode clamp screw 10. Upper electrode arm 9 is held at its inner end by set screws 37, as shown in FIG. 3, in moveable electrode arm holder 11, which is mounted on moveable bearing block 12, which has longitudinal side grooves to take ball bearings 13, which are placed to hold bearing block 12, between the outer bearing races 14. Outer bearing races 14 are slightly adjustable, so bearing block 12 may be made to ride freely between outer races 14 in the desired direction, yet have a minimum of movement in any other direction. Also shown in FIG. 1, are the vernier pressure indicator wheel 15, with fixed indicator pin 16, the coarse pressure indicator pointer 17, the coarse pressure indicator scale plate 18 on the side, and moveable electrode assembly return springs 39.

Referring to FIG. 2, which is the inner working view, pressure indicator adjusting screw 19 is held at its upper end by top cover 20, and at its lower end by bearing block 21. Pressure indicator adjusting screw 19 moves the internally threaded pressure indicator carriage 22, which carries the coarse pressure indicating arm 17 so that it extends through a slot in body 2 and over coarse pressure indicator scale 18, and also carries pressure signalling micro-switch 23. Pressure indicator carriage 22 is prevented from turning by the restriction of indicator arm 17 in its slot. Micro-switch 23 has a forked end actuating arm 24 through which pull chain 25 passes freely, but which will not pass pressure switch actuating disc 26 at the free end of pressure spring 27. Pull chain 25 passes over pulley 28, which is bolted through slot 29 to moveable bearing block 12 and upper electrode holder 11 by bolt 38, so that as upper bearing block 12 moves between outer races 14 on bearings 13, pulley 28 is free to move along slot 29. After passing over pulley 28, pull chain 25 passes through a hole in insulating section 3 and base 1 as shown, terminating in pull clevis 30. Any source of power may be used to exert force on pull clevis 30, a foot treadle, a knee treadle, or an air cylinder, but as these are not part of this invention and are commonly known, they are not shown. Far enough below pulley 28 so that it never rides on pulley 28 at the upper end of the stroke is insulating section 35 to electrically isolate that part of pull chain 25 that passes through base 1 from that part of chain 25 which is in contact with parts that are associated with upper electrode 8 to prevent a short circuit between parts carrying current to upper electrode 8 and base 1, which is part of the circuit carrying weld current to lower electrode 4. Pull limit disc 34 is placed firmly on pull chain 25 and is large enough so that it cannot pass through the hole in the insulating section 3, and is positioned on pull chain 25 so that the elastic limit of pressure spring 27 is not exceeded at any time, which would destroy the calibration of pressure spring 27, In FIG. 2, flexible conducting bonding strap 31 is secured to upper electrode holder 11 by bolt 38 and the other end folds back and is secured to the inner end of terminal bolt 32 as shown in FIG. 3. Binding strap 31 need not be insulated from any parts contained in body 2 except the clevis 30 end of pull chain 25, as they are all of the same electrical potential.

FIG. 3 is a side view showing the same numbered parts with the addition of upper electrode terminal bolt 32 and lower electrode terminal bolt 33 and upper electrode arm 9, set screws 37 and lower electrode arm 5, set screws 36.

Also shown in FIG. 3 (shown transposed) is the outer pointer end of coarse pressure indicator arm 17 and coarse pressure indicating scale plate 18.

FIG. 4 is a top view of the welder head assembly, showing the general outline of base 1 with its three hold-down feet for non-rocking characteristics, the location and lettering of vernier pressure indicator wheel 15 and fixed reference pin 16. Referring to FIG. 4, ball bearings 13 are shown between the outer grooves of moveable bearing block 12 and the inner grooves of bearing races 14, and as these parts are hardened they are literally linear ball-bearings, and move with the low friction associated with ball-bearings.

Referring to FIGS. 1 through 4, signal (ohmic sensing) and weld currents are conducted to lower fixed electrode 4 through terminal bolt 33, base 1, and lower electrode arm 5. Signal and weld currents are conducted to upper moveable electrode 8 through terminal bolt 32, bonding strap 31, bearing bolt 38 electrode arm holder 11, and electrode arm 9. These parts must be made of a good-conducting metal, or plated metal with the additional precaution that weight in the upper moveable electrode assembly consisting of parts numbered 8, 9, 10, 11, 12, 28, and 31, should be as little as practicable and copper-plated aluminum or light alloy may be employed.

In FIG. 5 which is the power supply and in a separate enclosure, power plug 101 is connected to an external power source, normally 115 volts at 60 cycles, and power is conducted through main power switch 102 to the primary of the main power transformer 165. 40 on the transformer 165 is the high voltage secondary, which supplies the current for the welding pulse. Switch 102 also operates pilot lamp 103 to indicate when the power is turned on. The center tap of transformer winding 40 is connected to the common ground, and each similar half of winding 40 terminates at a plate of identical grid-controlled rectifiers 50. The cathodes of rectifiers 50 are connected in parallel and the pulsations normally on the cathodes of rectifiers are smoothed by capacitor 159. Rectified current is conducted through current limiting resistor 112 to one set of normally closed contacts 134 of interlock relay 125 to the positive side of storage capacitors 124, the negative sides of storage capacitors 124 are connected to common ground. Capacitors 124 may be one or any number connected in parallel depending on the power desired. Meter 163 is connected across storage capacitors 124 to continuously monitor and indicate the power stored in capacitors 124. Resistor 113 is an isolating and current limiting resistor for the suppressor grids of rectifiers 50. Resistor 111 is the current limiting resistor for the control grids of rectifiers 50. To complete the controlled and regulated power supply, one of the halves of winding 40 also goes to the plate of diode 60 to supply a reference voltage. Since this draws very little current it does not effect the operation of the main rectifiers 50. The cathode of reference diode 60 connects to voltage dropping resistor 70, which conducts the output of diode 60 to the positive side of gas type voltage regulator tubes 81 connected in series and which are chosen to give the desired voltage reference level across potentiometer 110. Capacitor 90 is used to stabilize and smooth the reference voltage. This voltage could normally be from 350 to 450 volts for good operation. The tube filament circuits are so well known and common that they are omitted for sake of clarity of the rest of the circuits.

In FIG. 5, transformer 116 is the welding pulse transformer, which changes the comparable higher voltage, lower current from the storage capacitors 124 into lower voltage, higher current welding current. One side of primary winding 117 connects to the common ground, the other end connects to one of the normally open contacts of main discharge relay 123, the other contact of which connects to the positive side of storage capacitors 124. Relay 132 is the sensitive initiating relay, relay 127 is an intermediate relay to keep heavy control currents out of sensitive relay 132. Relay 125 is the timing and interlock relay, the action of these relays are explained under the operation sequence. Diodes 114 rectify the output of a low voltage winding on the main power transformer 165 for the operation of the relays and also to power the resistance measuring circuit described in FIG. 6. Capacitor 115 is a smoothing capacitor for this low voltage. High current winding 121 on weld pulse transformer 116 terminates at the welding electrodes 4 and 8 through cables 122. Resistance measuring signal source, winding 120 on the main power transformer 165, energizes winding 118 on weld pulse transformer 116 through current limiting and isolating resistor 119. This voltage could be of a nominal value of from six to ten volts for satisfactory operation. In FIG. 5, the weld resistance measuring components are as labeled in the boxes, and described in detail in FIG. 6, and switch 23 is the one described and located in FIG. 2 to operate pressure warning signal 164. The alternating voltage induced across secondary 121 of transformer 116 and the welding electrodes 4 and 8, is conducted by lead 160 to the ground side, and by lead 161 through contacts 162 of interlock relay 125 to the high side of the resistance measuring circuit, namely, across attenuator 128, and it is the setting of the slider on resistor 128 that establishes the relative resistance that the weld cycle is initiated at.

Satisfactory component values for the circuit described in FIG. 5 are as follows:

| Resistors— | Ohms |
|---|---|
| 70 | 22,000 |
| 111 | 390,000 |
| 112 | 150 |
| 92 | 20 |
| 113 | 390,000 |
| 119 | 10 |
| 110 | 500,000 |

| Capacitors— | Microfarads |
|---|---|
| 115 | 50 |
| 90 | 19 |
| 159 | 10 |
| 124 | 525 |
| 126 | 50 |

Referring to FIG. 6, the circuit used and shown here is a straight-forward transistor amplifier, rectifier, and Schmidt Trigger circuit. Conductors 160 and 161 through contacts 162 of relay 125 are the signal input conductors and attenuator 128 are the same as referred to in FIG. 5. Coupling capacitor 136 couples the alternating voltage signal from the slider on attenuator 128 but isolates the direct current bias on the base of first amplifier transistor 142. Resistors 137 and 139 establish the bias voltage on the base of transistor 142, while resistor 140 in the emitter circuit of transistor 142 provides some negative feed-back for stability. Capacitor 141 provides the alternating-current by-pass to ground for transistor 142. Potentiometer 138 is the load resistor for transistor 142 and also the gain control adjusted during manufacture to compensate for differences in components. Capacitor 143 couples the signal from the output of transistor 142 to the input at the base of transistor 144. Resistors 145 and 148 establish the bias on the base of transistor 144 and resistor 149 stabilizes transistor 144 while capacitor 150 by-passes the alternating-current signal to ground. The primary of output transformer 146 matches the collector impedance of transistor 144 while the center-tapped secondary provides a low-impedance full-wave output when rectified by diodes 147 and stabilized by capacitor 159. Capacitor 151 is the power supply smoothing capacitor. Potentiometer 152 adjusts the trigger point of the well-known Schmidt Trigger, composed of transistor 153, transistor 154, resistors 155, 156, 157, and 158 and sensitive relay 132.

Referring to FIG. 6, typical values for the components are:

| Resistors— | Ohms |
|---|---|
| 128 | 5,000 |
| 137 | 56,000 |
| 138 | 10,000 |
| 139 | 15,000 |
| 140 | 1,500 |
| 145 | 56,000 |
| 148 | 10,000 |
| 149 | 1,000 |
| 152 | 10,000 |
| 155 | 4,700 |
| 156 | 2,000 |
| 157 | 82 |
| 158 | 1,000 |

| Capacitors— | Microfarads |
|---|---|
| 136 | 15 |
| 141 | 15 |
| 143 | 10 |
| 150 | 15 |
| 151 | 15 |
| 159 | 15 |

Operation of the welding system is as follows:

*The Energy Charging and Storage Unit in FIG. 5*

After plug 101 is connected to a suitable power supply, main switch 102 is closed and the unit is allowed to warm up for a nominal time period of sixty seconds. During this time, the tube heaters bring the tube cathodes up to operating temperature, and direct voltage through diode 60 and resistor 70 increases until the ionization points of gaseous voltage regulator tubes 81 are reached, at which time the voltage across resistor 110 drops to the operating voltage, and due to the characteristics of regulator tubes 81, this voltage will remain practically constant even with considerable variation in the line voltage, so that this is no longer a variable. Also, due to the characteristics of thyratron rectifiers 50, if the control grids are a few volts more negative than the cathodes, the rectifiers will cease to conduct, which lets the operator control the output level of rectifiers 50 by positioning the slider on resistor 110 to the level he desires within the capacity of the power supply and which is continuously monitored by meter 163. After the desired operating level is selected on resistor 110, this voltage is impressed on the control grids of rectifiers 50 through resistor 111, and they will conduct until cathodes have become slightly more positive than the selected level, at which time conduction ceases until this level on the cathodes has lowered due to current flow, and then the cycle repeats. Current flow through limiting resistor 112 and normally closed contacts 134 of interlock relay 125 continues until the charge voltage in storage capacitors 124 is practically the same as that at the cathodes of rectifiers 50. This completes the charge cycle.

*The Resistance-Sensing and Weld Initiating Circuit in FIG. 6*

There is always an alternating voltage induced in winding 121 and across electrodes 4 and 8 when the welder is in use, due to the source winding 120 on main power transformer 165 through resistor 119, and this voltage is at maximum when welding electrodes 4 and 8 are electrically isolated from each other. This voltage is conducted through conductors 160 and 161 to attenuator resistor 128, which is the input to the resistance-sensing circuit of FIG. 6. During manufacture, an arbitrary trigger point for the Schmidt Trigger is selected by adjustment of the slider on resistor 152, and since the high side of resistor 152 is of negative potential, transistor 153 is normally kept in a conducting state, which, due to the voltage drop across load resistor 155, keeps transistor 154 in a normally non-conducting state, and these conditions are maintained until the voltage at the base of transistor 153 is at or very slightly lower than the trigger point of the circuit, but since the Schmidt Trigger circuit is very well known and explained in most texts on the subject, the operation of the circuit itself is omitted. It is obvious to those skilled in the art that once the trigger point is established at the base of transistor 153 there are ways to reverse the normally conducting state of transistor 153 and normally non-conducting state of transistor 154 externally. One way is to adjust the slider of resistor 128 toward the grounded end and in this way lower the input signal to a point where the amplified and rectified signal across resistor 152 permits the voltage at the base of transistor 153 to fall below the trigger point. Another way to lower this voltage is to short-circuit the terminal ends of winding 121, which terminate in electrodes 4 and 8, and the degree of shorting, or the resistance between electrodes 4 and 8 necessary to trigger the Schmidt Trigger would depend, for one parameter, upon the position of the slider on attenuating resistor 128, and if this were not moved, it would always take the same shorting resistance within commercially close limits, across electrodes 4 and 8 to trigger the Schmidt Trigger and energize sensitive relay 132, which initiates the weld cycle.

*Welder Set-Up, Interlock, and Timing Components Operation*

After turning on the power and allowing for warm-up, adjust energy level control 110 to an arbitrary level and also resistance selecting attenuator 128 to an arbitrary point. Place the pieces to be welded between stationary electrode 4 and moveable electrode 8. A force exerted on pull clevis 30 will move electrode 8 toward electrode 4 against only the resistance of the return springs 39 until the "work" is held tightly between electrode 4 and electrode 8, at which time electrode movement will cease, and further pull on clevis 30 extends pressure spring 27 until the pressure has reduced the electrical resistance between the electrodes 4 and 8, through the work, to a point low enough to reduce the signal across attenuator 128 so that the Schmidt Trigger reverses and energizes sensitive relay 132 which in turn operates intermediate relay 127 to release the energy in capacitor 126 into the coil of interlock relay 125. When interlock relay 125 is energized, the following events take place: (1) energy storage capacitors 124 are removed from the charging circuit by the opening of points 134, (2) all signals through conductor 161 are cancelled due to the opening of contacts 162, and (3) main discharge relay 123 is energized through contacts 135, allowing the energy stored in capacitors 124 to surge into the primary of welding transformer 116, which in turn causes a heavy current to flow through winding 121, into electrodes 4 and 8 and through the work, supplying the current to melt a small area of the work and thus welding the pieces together at that point. Signal cancelling contacts 162 are used to prevent the weld surge from momentarily raising the voltage at the base of transistor 153 and returning the Schmidt Trigger to normal momentarily, thus causing "chatter" or double weld. Energizing interlock relay 125 with the energy stored in capacitor 126 accomplishes two purposes; (1) operates relay 125 for a finite, selectable length of time regardless of whether the operator maintains pressure on the work and so keeps sensitive relay 132 energized, this time being dependent upon the capacity of capacitor 126, and this, in turn, limits the weld surge into the welding transformer 116 to the same time, a desirable feature for delicate welding, and (2) closes contacts 134 after a minimum of open time, thus returning storage capacitors 124 to the charging circuit without loss of time, to charge for the next weld. In actual operation, the closed time of relay 123 can be less than that required for the complete discharge of capacitors 124, thus removing them from the welding transformer 116 circuit before they can absorb power from the magnetic collapse of transformer 116, thus putting all the power into the weld. The resistance of resistor 119 and the impedance of winding 120 is relatively so much greater than the resistance through the metal being welded that this loss is of little consequence. This circuit also has the advantage of using but one timed relay in the capacitor discharge circuit, thus keeping resistance losses to a minimum. Inspection of the weld made with this arbitrary adjustment will disclose whether more or less heat is needed and adjustment of the slider on resistor 110 will correct for this, and sparking at the electrodes or sticking of the electrodes will indicate whether the weld resistance is set too high or low and adjustment of attenuator 128 will correct this. These symptoms are known to those familiar to the art.

It is obvious from this description that while pressure on the metal to be welded does contribute indirectly to the resistance between welding electrodes 4 and 8, the true signal that initiates the weld cycle is a function of electrical resistance between electrodes 4 and 8, and that this resistance is selectable within the range of the welder by the adjustment of attenuator 128 and it is only this reduction of signal that will initiate the weld cycle, and that any film on or contamination of the metal being welded, or exceedingly contaminated welding electrodes that would prevent the resistance from lowering to the trigger point would prevent the weld cycle from starting, thus saving good parts until the trouble was corrected and a good weld could be made.

*Operation of the Over-Pressure Indicator*

Once the correct energy level has been established by adjustment of the slider on resistor 110, and the optimum welding resistance has been selected by the adjustment of attenuator 128, vernier pressure wheel 15 is turned until pressure indicator switch 23 operates just after the weld cycle has been initiated, and it will be noted that pressure indicator lamp 164 will not light due to the fact that its source of power also comes through the normally closed contacts of relay 132 and these contacts are open after the weld cycle has started. However, if more pressure has to be exerted on the work than originally set up for before the weld cycle will start, pressure spring 27 will be further elongated, allowing actuating disc 26 to operate micro-switch 23 through actuating arm 24 and over-pressure indicator lamp 164 will light, since this occurs before the normally closed contacts of relay 132 open and break the power circuit. After the welder has been set up for a satisfactory weld, the pressure indicator readings may be taken, such as; 2A (2 on the coarse scale 18, and A on the vernier wheel 15), or 4 B/C as shown in FIG. 3 and FIG. 4, the energy level reading may be taken from meter 163, and the position of the slider on attenuator 128 noted, so that any later set-up for welding the same parts may be made easily.

*Operation of the Contaminated Electrode Indicator*

This operates the same as for the over-pressure indicator, except that inability to lower the signal level to a point necessary to operate the Schmidt Trigger will be caused by contaminated electrodes 4 and 8 instead of contamination of the work metal, but can be equally the cause of poor welds. In either case, the operator will have an indication that a change in the weld set-up has occurred as soon as it occurs and may take corrective steps to prevent work spoilage.

It is obvious that, while this novel resistance-sensing system has been shown and described in conjunction with a stored energy type of welder power supply, this same system could be used with other power sources as well. Also, while only two capacitors 124 are shown as power storage components, just one could be used in a smaller power supply or more than two could be used in a larger power supply without affecting the spirit of this invention. Also, while a signal source is shown herein as being taken from a winding 120 on the main power transformer 165, and works very well, in some cases it might be advantageous to use a source of different frequency than this source, such as an auxiliary oscillator, and be introduced across welding electrodes 4 and 8 in a different manner, and could not be construed as an improvement over this disclosed invention. Also, the use of a different indicator over lamp 164 would in nowise alter the basic conception.

I claim:

1. In an electrical spot-welder for welding work between two electrodes connected with a welding power source:
   means for introducing a continuous and steady signal across said welding electrodes so that the amplitude of said signal voltage across said electrodes is affected by the ohmic resistance between the electrodes through the work;
   means for directly measuring said signal voltage across said electrodes for obtaining a varying signal voltage as the pressure of said electrodes on said work increases, and
   switching means responsive to said measuring means and operated by a predetermined value of said signal voltage for applying said welding power to said electrodes.

2. In an electrical spot-welder as defined in claim 1:
   a voltage level reference circuit for establishing a voltage comparison level;
   said signal measuring means including a voltage percentage circuit to select a ratio between full signal amplitude and said reference level so that the varying signal voltage operates said switching means at any selected resistance value between said electrodes by comparison with said reference level as said signal amplitude changes due to changes of ohmic resistance between said electrodes.

3. In an electrical spot-welder as defined in claim 1:
   said switching means comprising an electronic trigger of selectively fixed triggering level;
   a signal voltage dividing means for selecting a ratio between total signal voltage and said triggering level;
   and power means connected to said electronic trigger for controlling said welding source;
   said trigger being controlled by change of signal amplitude across said electrodes due to ohmic resistance change between said electrodes and through the work as progressive pressure is applied.

4. In combination, a welding circuit power source, welding electrodes, an A.C. signal injecting means applying a steady and continuous signal across said welding electrodes, switching means in the welding power source circuit, an electronic trigger of selectably fixed triggering level as a voltage reference, measuring means for comparing a selectable percentage of the total voltage signal across said electrodes with said reference level, and power means for controlling said switching means in said welding power source circuit, said power means being actuated by said trigger when the selected signal percentage equals the selected reference level, said signal voltage being determined by the ohmic resistance between said electrodes as progressive pressure is applied.

5. In an electrical spot-welder having work engaging welding electrodes connected to a source of power:
   signal generating means for applying a signal to said electrodes, the amplitude of said signal varying with the ohmic resistance across said electrodes and through said work;
   signal measuring means connected to said electrodes for measuring the amplitude of said signal; and
   switching means connected to said measuring means, said measuring means actuating said switching means to complete an electrical circuit from the source of power to said welding electrodes when said amplitude reaches a predetermined value.

6. In an electrical spot-welder as defined in claim 5:
   said power circuit including a transformer coupled to said electrodes and a condenser connected to the primary of said transformer and discharged by said switching means.

7. In an electrical spot-welder, a primary welding power source, a secondary welding circuit, welding electrodes, a signal voltage source continuously applying a signal voltage across said electrodes, an amplifier amplifying said signal voltage across said electrodes, a rectifier to change said amplified signal voltage to D.C., a Schmidt Trigger of selectable trigger voltage level for reference, a voltage dividing circuit to select a ratio of total signal voltage to be amplified so as to equal the trigger voltage level at any selected ohmic resistance between said electrodes, switching means in said primary weld power source, power means for actuation of said switching means, said power means being controlled by said trigger, so that when the amplified signal voltage equals the reference voltage causing the trigger to operate, said power means operates said switch in the primary weld power source, causing the weld cycle to start, the whole sequence being directly related to the ohmic resistance through the work between said electrodes as pressure is progressively applied.

References Cited in the file of this patent

UNITED STATES PATENTS

| | | |
|---|---|---|
| 1,673,500 | Dwyer | June 12, 1928 |
| 1,933,936 | Schnetzer | Nov. 7, 1933 |
| 1,967,094 | Lincoln | July 17, 1934 |
| 1,988,537 | Breguet | Jan. 22, 1935 |
| 2,112,716 | Smith | Mar. 29, 1938 |
| 2,249,488 | Nickle | July 15, 1941 |
| 2,306,593 | Collom | Dec. 29, 1942 |
| 2,314,099 | Mikhalapov | Mar. 16, 1943 |
| 2,377,601 | Bayles | June 5, 1945 |
| 2,401,528 | Vang | June 4, 1946 |
| 2,433,827 | Callender | Jan. 6, 1948 |
| 2,433,967 | Van Seiver | Jan. 6, 1948 |
| 2,435,577 | Dawson | Feb. 10, 1948 |
| 2,472,042 | Davies | May 31, 1949 |
| 2,472,368 | Cox | June 7, 1949 |
| 2,521,471 | May | Sept. 5, 1950 |
| 2,593,504 | Varela | Apr. 22, 1952 |
| 2,688,065 | Clark | Aug. 31, 1954 |
| 2,689,295 | Goldner | Sept. 14, 1954 |
| 2,872,564 | Du Fresne | Feb. 3, 1959 |
| 2,996,604 | Lemson et al. | Aug. 15, 1961 |